(12) United States Patent
Then et al.

(10) Patent No.: US 6,843,397 B2
(45) Date of Patent: Jan. 18, 2005

US006843397B2

(54) DEVICE FOR HOLDING CONTAINERS, ESPECIALLY BEVERAGE CONTAINERS

(75) Inventors: Gebhard Then, Bad Neustadt (DE); Thilo Schultheis, Salz (DE)

(73) Assignee: Preh-Werke GmbH & Co. KG, Bad Neustadt a.d. Saale (DE)

( * ) Notice: Subject to any disclaimer, the term of this patent is extended or adjusted under 35 U.S.C. 154(b) by 92 days.

(21) Appl. No.: 10/309,041

(22) Filed: Dec. 4, 2002

(65) Prior Publication Data

US 2004/0016783 A1 Jan. 29, 2004

(30) Foreign Application Priority Data

Dec. 4, 2001 (DE) .......................................... 101 59 461

(51) Int. Cl.⁷ .................................................. B60R 7/00

(52) U.S. Cl. ........................ 224/552; 224/570; 224/926; 248/311.2

(58) Field of Search ................................ 224/545, 552, 224/553, 567, 570, 926; 248/311.2; 297/188.01, 188.14

(56) References Cited

U.S. PATENT DOCUMENTS

| 1,168,265 | A | | 1/1916 | Kratz |
| 5,634,621 | A | * | 6/1997 | Jankovic .................. 248/311.2 |
| 6,230,948 | B1 | * | 5/2001 | Steiger et al. ............... 224/539 |
| 6,547,117 | B2 | * | 4/2003 | Glovatsky et al. .......... 224/539 |
| 2004/0079850 | A1 | * | 4/2004 | Takahashi ................ 248/311.2 |

FOREIGN PATENT DOCUMENTS

| DE | 197 44 919 A1 | 5/1998 |
| DE | 199 04 124 A1 | 3/2000 |
| DE | 199 59 599 A1 | 6/2000 |
| DE | 199 50 889 A1 | 4/2001 |
| WO | WO 0143941 A1 | 6/2001 |

\* cited by examiner

Primary Examiner—Stephen K. Cronin
(74) Attorney, Agent, or Firm—Birch, Stewart, Kolasch & Birch, LLP

(57) ABSTRACT

In order to be able to initiate in a simple way the power adjustment of retaining arms of a device for holding containers, it is proposed to trigger control of an actuating drive initially by displacement of at least a bottom part of the holder, and subsequently by rotation of a container inside the holder. This permits unambiguous and intentional switch-on of the actuating drive inside the holder.

13 Claims, 4 Drawing Sheets

DEVICE FOR HOLDING CONTAINERS, ESPECIALLY BEVERAGE CONTAINERS

This nonprovisional application claims priority under 35 U.S.C. §119(a) on Patent Application No. 101 59 461.5, filed in Germany on Dec. 4, 2001, which is herein incorporated by reference.

BACKGROUND OF THE INVENTION

The upright transport of containers in motor vehicles or the like is made difficult by the fact that these containers are subjected to the movements of the vehicles during travel. Consequently, for beverage containers in particular, efforts are made to produce a device for holding such containers, often even open containers, that is easy to operate and can hold different types of containers.

From DE 199 59 599 A1 is known a generic device for holding beverage containers in motor vehicles. This device has a pot-like receiving part with side walls and a bottom wall. Swivel-mounted on the receiving part are retaining arms that can pivot into pockets in the side wall. Beneath the bottom wall is an actuating drive, by which means the retaining arms can be pivoted synchronously in a power-driven manner. The actuating drive is controlled by an occupancy detector, which uses at least two sensors for detection.

SUMMARY OF THE INVENTION

It is therefore an object of the present invention to provide a device for holding containers or similar objects in motor vehicles, or similar powered or unpowered vehicles.

The device according to the present invention comprises at least one opening and a bottom part along with retaining arms, which are swivel-mounted and can pivot into a release position and a holding position for a container, wherein a pulse generator triggers a first pulse for an actuating drive for the retaining arms when the container is placed on the bottom part, causing at least the bottom part to move downward and the retaining arms to be brought into the holding position, and another pulse is triggered when the container is rotated for removal of the same, causing the retaining arms to be brought into the release position.

Derived from the consideration that, especially during travel, a vehicle can push, press down, and lift a container, but not rotate it, the invention is based on the concept of actuating the motor drive for the retaining arms of a holder by pressing down and by rotating or turning the container. Thereby, a simple design solution that integrates easily into the holder was chosen, by which the motor drive can be triggered initially by displacing at least a bottom part of the holder to actuate the holding function, and subsequently can be triggered to actuate the "open" function by rotating a container inside the holder. This additionally allows unambiguous switching of an actuating drive in the holder. This device is intended to be used to hold beverage containers.

The device or holder has at least one opening or one receptacle section with an adjustable bottom part, into which may be placed a container, such as a can, bottle or the like. The bottom part is then moved downward, in particular by the weight of the container itself, and triggers a pulse by means of a pulse generator, which preferably comprises one or more switches. The first actuated switch starts this pulse for a motor as an actuating drive for the retaining arms. This motor pulls preferably three to four holders or retaining arms, which are kidney-shaped for example, inward toward the center so that they contact and lightly grip the outer wall of the container.

In order to remove the container, a human operator rotates the container by a certain, predetermined angle. This again triggers a pulse (flip-flop circuit). The motor then moves preferably opposite to its previous direction and releases, for example, a retaining spring, for example, to the release point and then moves the retaining arms outward.

In a further development of the invention, an elastomer is molded onto the tips of the retaining arms and is pressed against the container by the retaining arms. The elastomer presses against the container with a variable force, since the motor continues to move to an end position. The larger the container that is placed inside, the greater is the retaining force.

In a further development of the invention, the elastomer's adhesion to the container facilitates easy removal of the container through rotation thereof, which causes the retaining arms to be turned with the container, triggering the pulse required for release. This has the advantage of avoiding premature release of the retaining arms from the container.

The motor is mounted on a support plate, in or on which the three to four retaining arms are also located. The pivoting retaining arms are connected via levers with toothed segments to a segment wheel which can be moved by the motor via a worm and a drive wheel. Power transfer between the segment wheel and lever is elastic. The sooner the retaining arms make contact with the insert, the greater the force of the spring becomes, because the motor, which travels to its end position, has the effect that the relative rotation between the segment wheel and the support plate is increased. The motor moves the drive wheel back and forth using the worm, preferably only through the same angle.

In another embodiment, movement of the retaining arms can also be accomplished through levers supported in the segment wheel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Detailed description given hereinbelow and the accompanying drawings, which are given by way of illustration only, and thus, are not limitive of the present invention, and wherein.

DETAILED DESCRIPTION OF THE PREFERRED EMBODIMENTS

Figure 1:
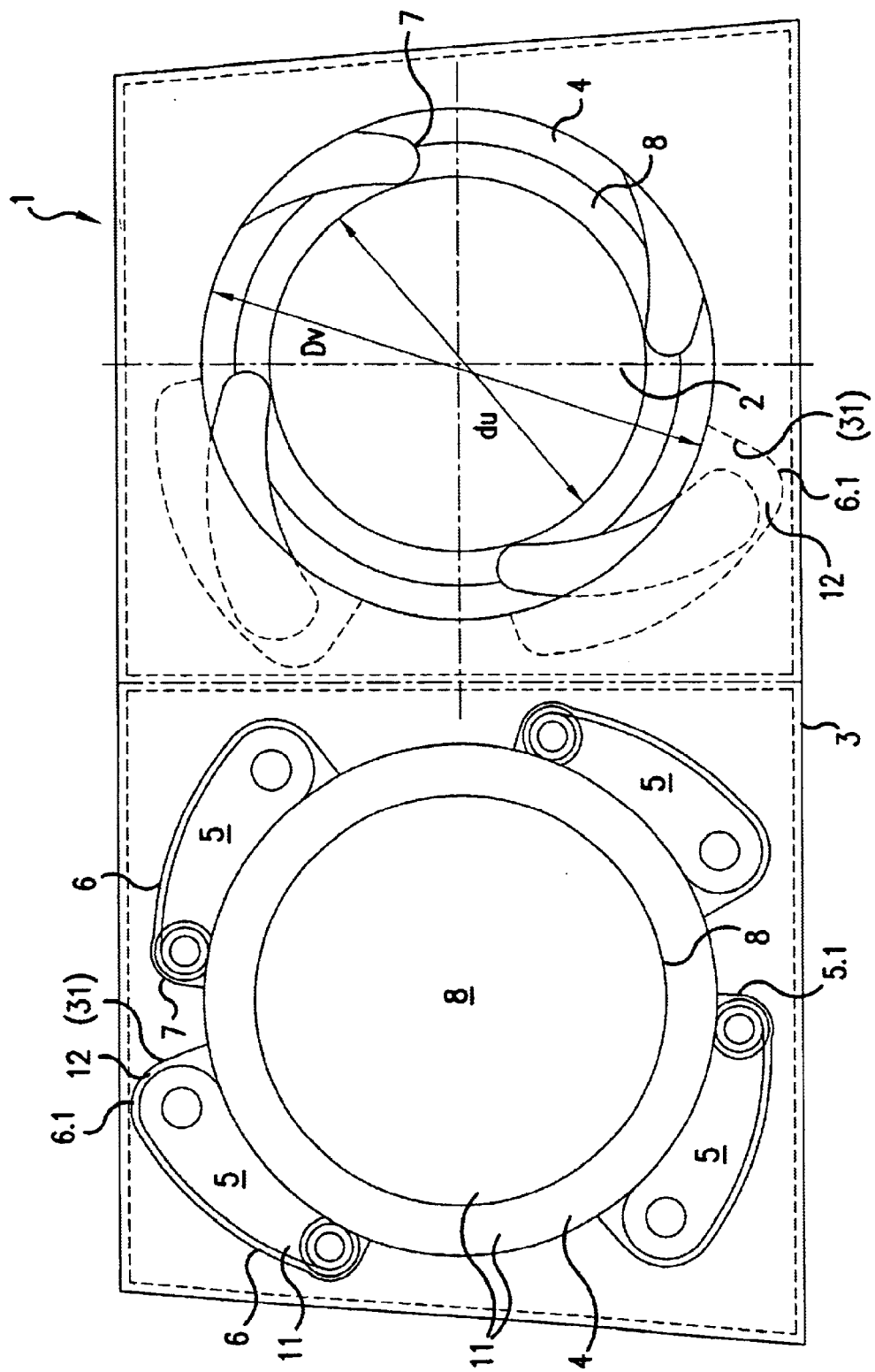
FIG. 1 is a top view of a holder for holding two beverage containers.
Figure 4:
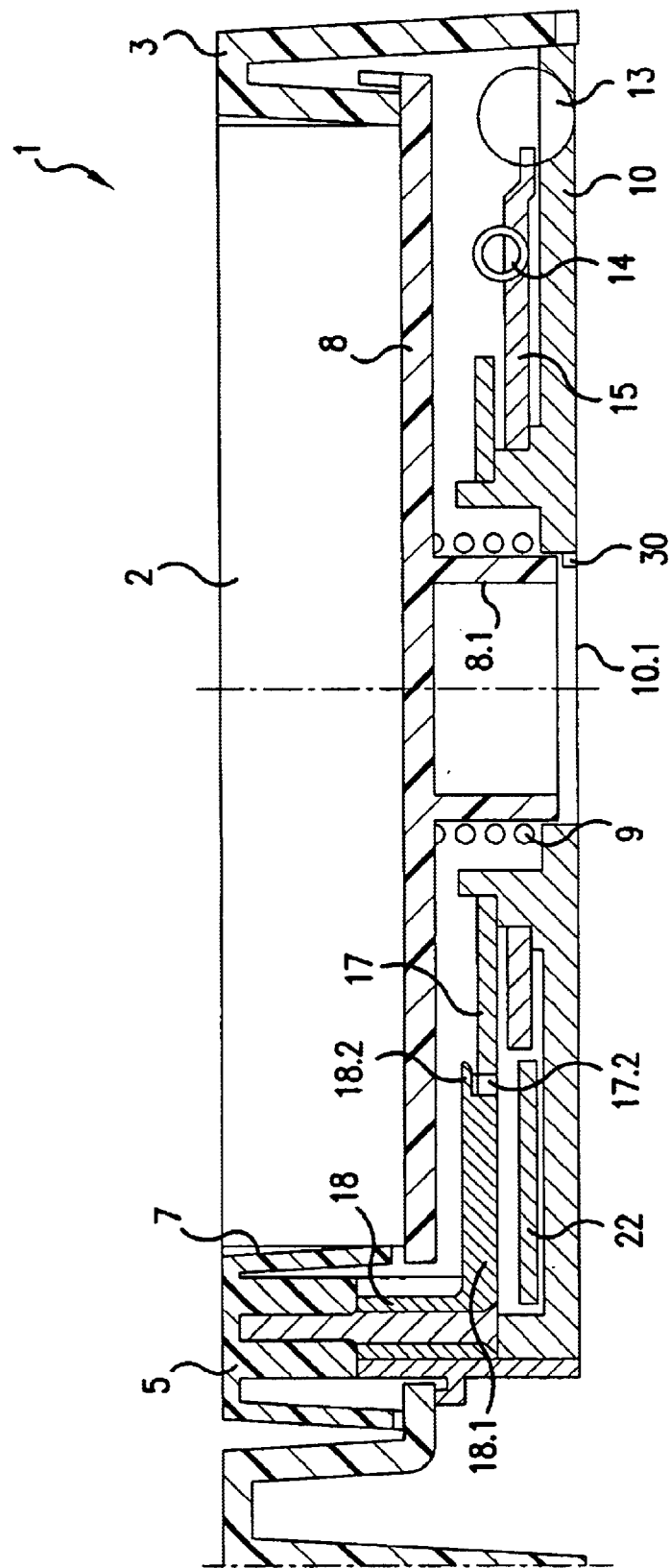
FIG. 4 is a cross-sectional representation of section A—A from FIG. 2.

FIG. 1 illustrates a top view of a holder 1, or a device to hold two beverage, containers 2 or similar objects in motor vehicles or similar powered or unpowered vehicles. The holder 1 has a housing 3 with at least one opening 4. Furthermore, movably mounted retaining arms 5, preferably four in number, are uniformly distributed about the circumference and, for example, are arranged in pockets 6 directly below said opening 4. Molded onto the tips 5.1 of the retaining arms 5 is an elastomer 7 or similar material. A bottom part 8 of the holder 1 is mounted on a support plate 10 by a compression spring 9 (FIG. 4). The bottom part 8 forms, together with the retaining arms 5 and the opening 4, a so-called receptacle section 11 for the beverage container 2. The holder 1 has a receptacle section 11 that is adjustable in the diameter $D_V$ by means of the retaining arms 5 with the elastomer 7. The adjustable diameter $D_V$ of the receptacle section 9 is determined by the different diameters $d_U$ of the different beverage containers 2. The variation of the adjustable diameter $D_V$ can be between 50 and 90 mm, for example. The retaining arms 5 can pivot into and out of the free spaces or pockets 6. Within the free spaces 6 is provided a recess 12, which is delimited by a wall 6.1 of the free spaces 6.

Figure 2:
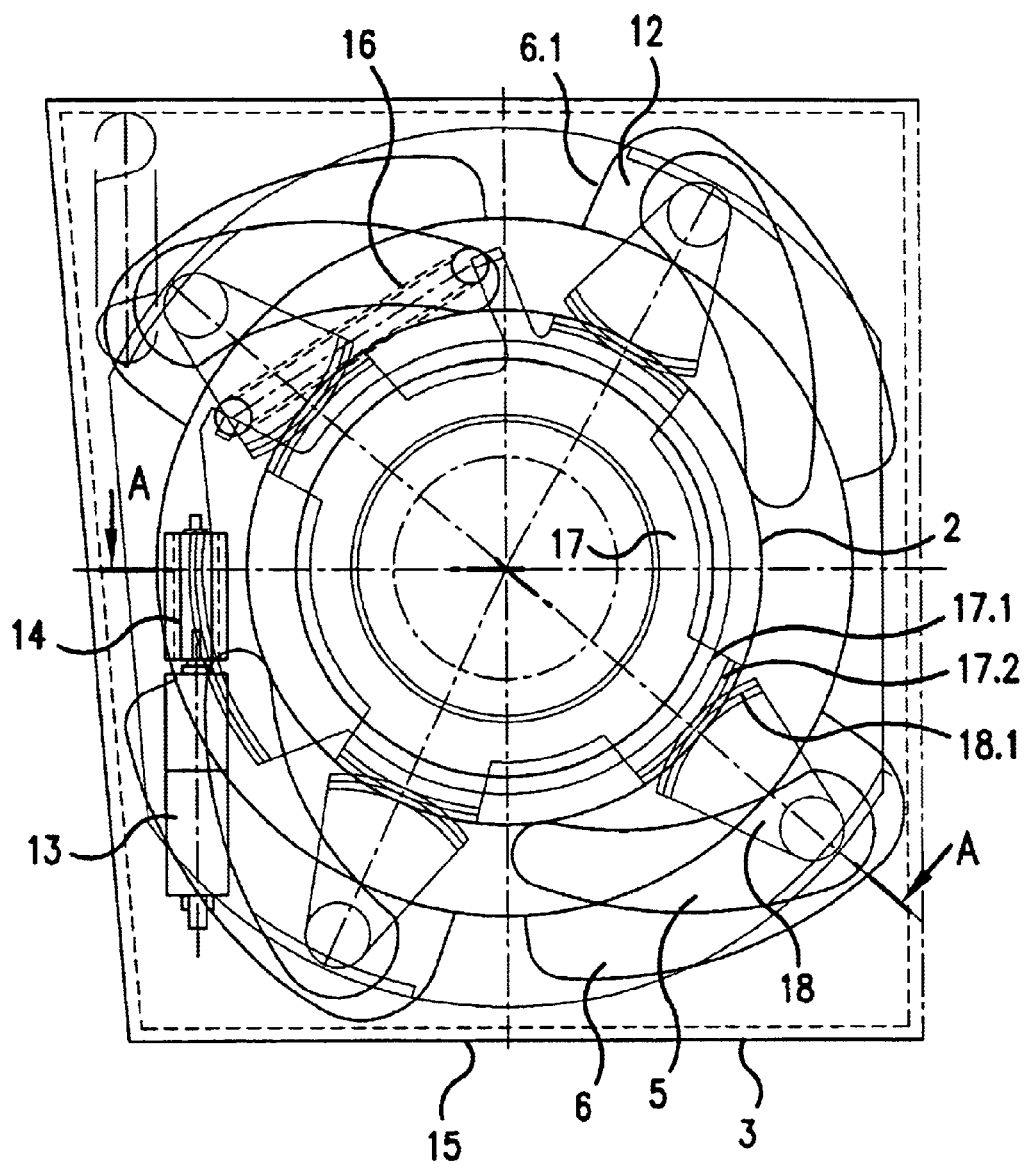
FIG. 2 is a view of the holder from FIG. 1 with motor drive and toothed segment.

The retaining arms 5 are moved by an actuating drive (motor) 13, as shown in FIG. 2.

The retaining arms 5 are moved by an actuating drive (motor) 13, as shown in FIG. 2.

The motor 13 is arranged in the housing 3 of the holder 1, preferably directly next to the bottom part 8, and during operation drives, via a worm 14, a drive wheel 15 beneath the bottom part 8, in which a spring 16 is attached to one side of said drive wheel. The other end of the spring 16 is connected to a segment wheel 17. The segment wheel 17 has on its circumference four, corresponding to the number of retaining arms 5, segment sections 17.1, on which teeth 17.2 are located. Cooperating therewith are teeth 18.2 of toothed segments 18.1, which in turn are connected to levers 18 for moving the retaining arms 5.

When the beverage container 2 is placed inside, the bottom plate 8 is moved downward approximately 1.5–2 mm along with the beverage container 2. As a result of this movement, a pulse for the motor 13 is triggered by at least one of three switches forming a pulse generator 30. The motor 13 starts, and in so doing, moves the segment wheel 17. Movement of the segment wheel 17 causes rotation of the toothed segments 18.1, and thus of the levers 18, which pivot the retaining arms 5 out of their neutral position in the process. The four retaining arms 5, which in their nonactuated state can be concealed beneath a decorative wooden trim (not shown), for example, are pulled inward by means of the levers 18. In the process, the elastomer 7 on the tips 5.1 presses against the beverage container 2 with a variable force, thus fixing it in place. When the tips 5.1 of the retaining arms 5 grip the beverage container 2, the drive wheel 15 is still in motion and pulls the spring 16 taut (extends it). The result of this force amplification is that the retaining arms 5 hold the beverage container 2 firmly. The spring 16 thereby functions as a force amplifier.

For removal, the operator rotates the beverage container 2, for example by approximately 5°. As a result of the elastomer adhesion, the retaining arms 5 are rotated as well. In this process, a pulse is triggered by the pulse generator 30 or another pulse generator 31, which activates the motor 13 such that the motor moves preferably opposite to its previous direction of rotation and the pockets or free spaces 6. Rotation of the retaining arms 5 with the beverage container 2 then causes a pulse to be triggered, for example, if at least one of the retaining arms 5 contacts the wall 6.1 in one of the pockets 6.

Figure 3:
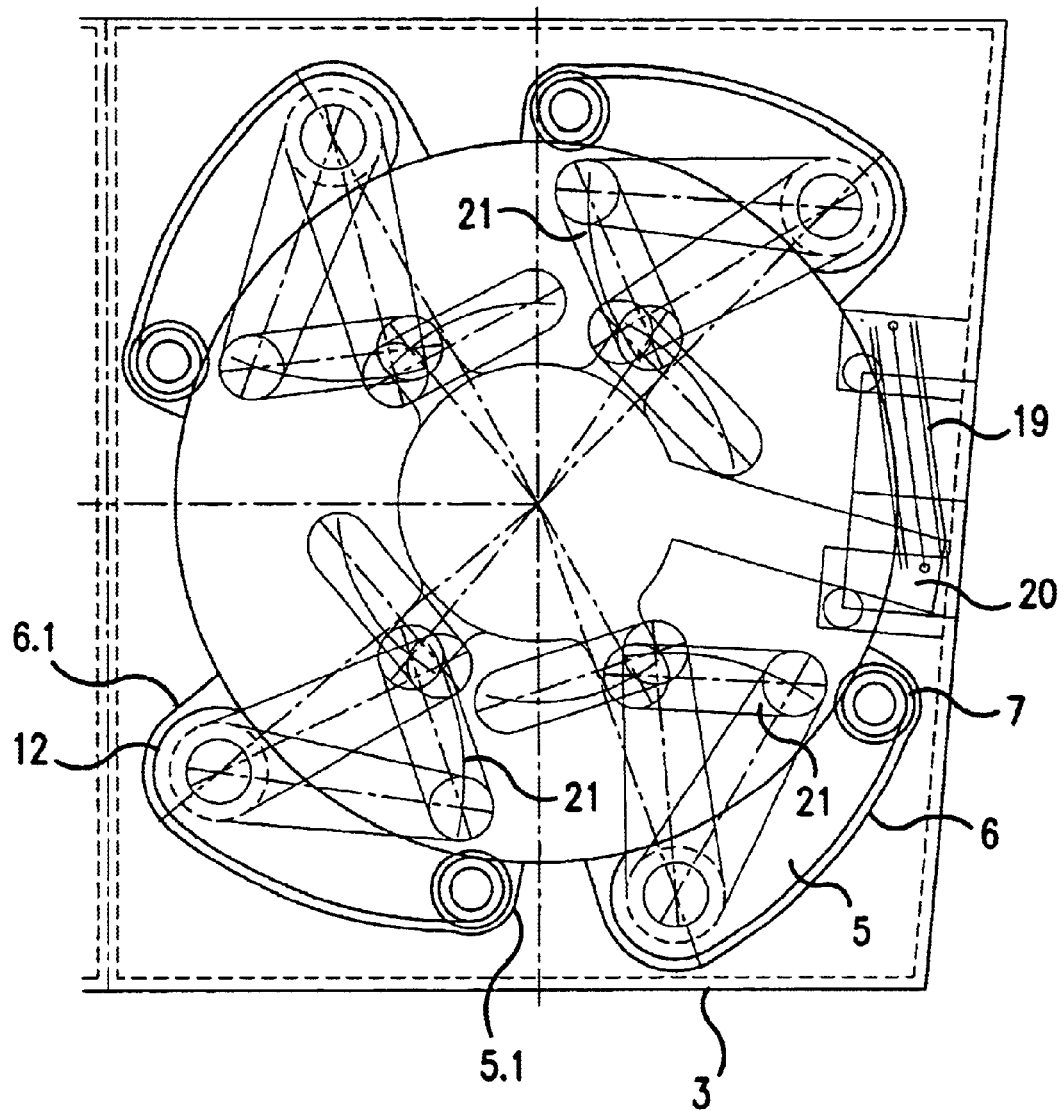
FIG. 3 is a view of the holder from FIG. 1 with lever movement.

FIG. 3 shows another solution, wherein the adjusting movement is achieved by articulations 21. Here, a worm 19 that stands in functional connection with a drive wheel 20, is moved by a motor, which is not shown. By the articulations 21, which preferably grip the retaining arms 5 from below, the retaining arms 5 are pulled toward the center or back outward when the drive wheel 20 is actuated.

FIG. 4 shows the holder 1 as a section A—A from FIG. 2 in order to better illustrate the parts located beneath the bottom part 8. The motor 13 is rigidly mounted on the support plate 10, and the drive wheel 15 and the segment wheel 17 are movably mounted thereupon. On the same plane as the segment wheel 17 are attached the toothed segments 18.1 that are held by levers 18, which are supported on the support plate 10. The retaining arms 5 are attached to the levers 8. A printed circuit board 22, which carries the necessary electronic components, including, for example, the motor electronics, is likewise located on the support plate 10. The bottom part 8 has in its center a projection 8.1, which is surrounded by the compression spring 9, by which the bottom plate 8 presses against the housing 3 in the absence of the effects of weight. The support plate 10 has an opening 10.1 to allow entry of the projection 8.1 of the bottom plate 8 during functional use.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for holding containers in vehicles, the device comprising:
   at least one opening and a bottom part;
   retaining arms, which are swivel-mounted and can pivot into a release position and a holding position for a container; and
   a pulse generator for triggering a first pulse for an actuating drive for the retaining arms, when the container is placed on the bottom part, thereby causing at least the bottom part to move downward and the retaining arms to be brought into the holding position, and
   wherein second pulse is triggered when the container is rotated for removal, causing the retaining arms to be brought into the release position.

2. The device according to claim 1, wherein the second pulse, during rotation of the container, is generated by the pulse generator.

3. The device according to claim 1, wherein at least the bottom part can move downward 1.5 to 2 mm.

4. The device according to claim 1, wherein an elastomer material is molded onto tips of the retaining arms.

5. The device according to claim 1, wherein rotation of the container causes the retaining arms to be rotated.

6. The device according to claim 5, wherein the rotation takes place about a predetermined angle.

7. The device according to claim 1, wherein an actuating drive pivots the retaining arms by means of a worm, a drive wheel and a segment wheel, as well as toothed segments and associated levers, wherein a spring is incorporated between the drive wheel and the segment wheel.

8. The device according claim 7, wherein, the actuating drive is moved in an opposite direction when the retaining arms are brought into the release position, than when the retaining arms are brought into a holding position.

9. The device according to claim 1, wherein an actuating drive moves the retaining arms by means of articulations, wherein the articulations are operatively connected a drive wheel, which is driven by a worm that is moved by the actuating drive.

10. The device according claim 9, wherein, the actuating drive is moved in an opposite direction when the retaining arms are brought into the release position, than when the retaining arms are brought into a holding position.

11. The device according to claim 1, wherein the retaining arms are held in free spaces.

12. The device according to claim 11, wherein the free spaces each have a recess, which is delimited by a wall of the free space.

13. The device according to claim 12, wherein the second pulse is generated by contact of at least one of the retaining arms with the wall of the free space, as the container is rotated.

* * * * *